United States Patent

Shirai et al.

(10) Patent No.: US 9,677,255 B2
(45) Date of Patent: Jun. 13, 2017

(54) PERSON-DETECTING SENSOR AND AUTOMATIC WATER FAUCET

(71) Applicant: LIXIL Corporation, Tokyo (JP)

(72) Inventors: Yuki Shirai, Tokyo (JP); Nobuaki Itazu, Tokyo (JP); Hiroyuki Oura, Tokyo (JP)

(73) Assignee: LIXIL Corporation, Tokyo (JP)

( * ) Notice: Subject to any disclaimer, the term of this patent is extended or adjusted under 35 U.S.C. 154(b) by 0 days.

(21) Appl. No.: 14/952,174

(22) Filed: Nov. 25, 2015

(65) Prior Publication Data

US 2016/0083943 A1    Mar. 24, 2016

Related U.S. Application Data

(63) Continuation of application No. PCT/JP2014/002409, filed on May 2, 2014.

(30) Foreign Application Priority Data

May 31, 2013  (JP) ................. 2013-116112

(51) Int. Cl.
E03C 1/05       (2006.01)
G01V 8/20       (2006.01)
G01S 17/02      (2006.01)

(52) U.S. Cl.
CPC ............ *E03C 1/057* (2013.01); *G01S 17/026* (2013.01); *G01V 8/20* (2013.01)

(58) Field of Classification Search
CPC .................................. G01V 8/10; E03C 1/057
USPC ...................... 4/619–660; 376/207
See application file for complete search history.

(56) References Cited

U.S. PATENT DOCUMENTS

2004/0084609 A1    5/2004  Bailey
2006/0200903 A1    9/2006  Rodenbeck et al.

FOREIGN PATENT DOCUMENTS

| CN | 101556727    | 10/2009 |
| CN | 101949163    | 1/2011  |
| CN | 202812395    | 3/2013  |
| JP | 2002-267766 A | 9/2002 |
| JP | 2010-285787 A | 12/2010 |
| JP | 2011-137289 A | 7/2011 |

(Continued)

OTHER PUBLICATIONS

International Search Report from International Application No. PCT/JP2014/002409 mailed on Aug. 12, 2014.

(Continued)

*Primary Examiner* — Lori Baker
(74) *Attorney, Agent, or Firm* — Claire Zopf

(57) ABSTRACT

A person-detecting sensor includes: a range-finding unit that decides whether a distance to a detection object falls within a predetermined detection distance range; a received-light quantity decision unit that decides whether a received-light quantity is equal to or greater than a predetermined received-light quantity threshold; and a continuation decision unit that decides whether a state of the detection object being present is ongoing. In the received-light quantity decision unit, after water discharge is started upon the detection determination unit determining a detection object to be under detection state, for a period during which the continuation decision unit decides the state in which the detection object being present is ongoing, the received-light quantity threshold is set to be lower than prior to when the water discharge is started.

5 Claims, 7 Drawing Sheets

(56) References Cited

FOREIGN PATENT DOCUMENTS

| JP | 2012-077472 A | 4/2012 |
|---|---|---|
| JP | 2012-117256 A | 6/2012 |
| JP | 2013-057202 A | 3/2013 |
| JP | 2013-064260 A | 4/2013 |
| WO | 2012-043663 A1 | 4/2012 |

OTHER PUBLICATIONS

International Preliminary Report on Patentability from International Application No. PCT/JP2014/002409 mailed on Dec. 10, 2015.
International Preliminary Report on Patentability from International Application No. PCT/JP2014/002409 mailed on Dec. 10, 2015 (English Translation).
Search Report from Chinese Patent Application No. 201480029508.2 mailed on Nov. 22, 2016.
European Search Report in European Patent Application No. 14803695.7 issued Dec. 7, 2016.

PERSON-DETECTING SENSOR AND AUTOMATIC WATER FAUCET

BACKGROUND OF THE INVENTION

1. Field of the Invention

The present invention relates to person-detecting sensors employed in automatic water faucets, automatic flushers for urinals, and in like applications, and to automatic water faucets provided with such sensors.

2. Description of the Related Art

Automatic water faucets that automatically discharge water upon detecting a user's hand waving action have been known to date. A person-detecting sensor for detecting a person having drawn near is incorporated into the automatic water faucets. A person-detecting sensor in which an imaging element such as a charge coupled device (CCD) or a complementary metal oxide semiconductor (CMOS), and a light-emitting element such as an LED are arranged offset has been proposed as a person-detecting sensor of this sort.

This person-detecting sensor, identifying the position where reflected light, returned from a detection object in response to emitted light, is incident, measures distance to the detection object by the principle known as triangulation, and determines whether the detection object is present within a predetermined detection distance. Person-detecting sensors employing imaging elements enable reflected-light incident position to be identified with high accuracy from the distribution of received-light quantity of each pixel of the imaging element, making highly accurate ranging possible (reference is made to, for example, Patent Document 1).

Patent Document 1 Japanese Pat. App. Pub. No. 2012-77472

At an automatic water faucet on a sink, for example, accumulating water in the palms of the hands would be an assumed usage situation. In such usage situations, in the transition to water accumulating after water discharge has started, air bubbles or the like produced within the accumulated water repeatedly refract and reflect the light, which can end up diffusing the light such as to lower the received-light quantity of reflected light. In this case, the detection may lapse into an unstable state due to a decrease in the received-light quantity of reflected light, risking that the water may be switched off despite the fact of being in use.

SUMMARY OF THE INVENTION

An object of the present invention, brought about taking into consideration the problems to date, is to provide a person-detecting sensor with high detection accuracy and excellent properties and an automatic water faucet.

A first embodiment of the present invention relates to a person-detecting sensor for an automatic water faucet provided with an imaging unit that includes an imaging element in which pixels are arrayed either one-dimensionally or two-dimensionally, and a light-emitting unit disposed offset from the imaging unit in a predetermined direction, wherein the imaging unit, receiving reflected light generated by light incident from the light-emitting unit, detects a person, as a detection object, located within a predetermined detection distance range, the person-detecting sensor including:

an imaging operation control unit that controls an imaging operation carrying out light emission by the light-emitting unit and light receiving by the imaging unit;

a readout unit that reads out the respective received-light quantity of pixels constituting the imaging element;

a range-finding unit that identifies position where the reflected light is incident in a light-receiving region, which is a region in which pixels constituting the imaging element are arrayed in the predetermined direction, and that decides whether distance to the detection object derivable by the principle of triangulation from the incident position falls within the predetermined detection distance range;

a received-light quantity decision unit that performs a determination by a threshold with regard to the received-light quantity read out by the readout unit, and decides whether the received-light quantity is equal to or greater than a predetermined received-light quantity threshold;

a detection determination unit that determines a detection object to be under detection state when the distance to the detection object is decided by the range-finding unit to fall within the predetermined detection distance range and the received-light quantity is decided by the received-light quantity decision unit to be equal to or greater than the received-light quantity threshold; and a continuation decision unit that decides whether a state of a detection object being present is ongoing, wherein in the received-light quantity decision unit, after water discharge is started upon the detection determination unit determinating a detection object to be under detection state, for a period during which the continuation decision unit decides the state in which the detection object being present is ongoing, the received-light quantity threshold is set to be lower than prior to when the water discharge is started (claim 1).

A second embodiment of the present invention relates to an automatic water faucet including:

a water faucet that discharges water to the inside of a bowl provided with a drainage port at the bottom of the bowl;

a person-detecting sensor that achieves the first embodiment; and a water supply control unit that performs the switching of discharging and stopping of water from the water faucet by using a sensor signal that is output by the person-detecting sensor depending on whether the current state is a detection state or a non-detection state.

A person-detecting sensor according to the present invention includes a continuation decision unit that decides whether a state of a detection object being present is ongoing. A received-light quantity threshold is lowered and set to be low during a period when the state of the detection object being present is decided to be ongoing after water discharge is started. In a person-detecting sensor configured as described, the possibility of water being stopped during the accumulation of water due to an erroneous determination indicating that the current state is a non-detection state is low, for example, even when the light-received quantity of reflected light becomes decreased under a usage condition where water is accumulated in the palms of the hands.

As described above, a person-detecting sensor according to the present invention is a person-detecting sensor with high detection accuracy. An automatic water faucet according to the present invention that is provided with this person-detecting sensor is a water faucet with little erroneous operation and high operational reliability.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

A detailed explanation regarding an embodiment of the present invention will be given by using the following exemplary embodiments.

First Exemplary Embodiment

Figure 1:
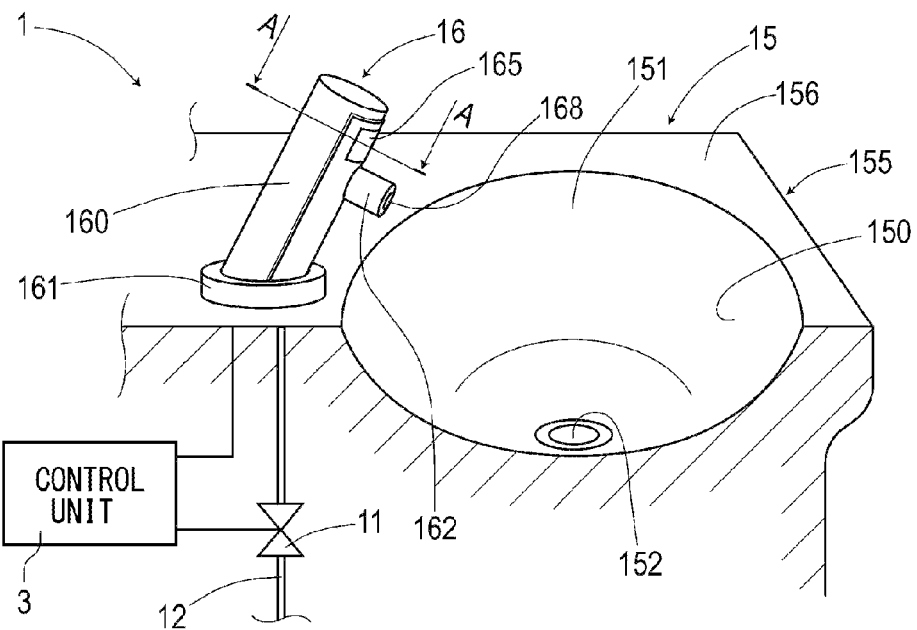
FIG. 1 is a perspective cross-sectional view illustrating a sink provided with an automatic water faucet in a first exemplary embodiment.

This exemplary embodiment represents an example where a person-detecting sensor 1 is employed in a water faucet (automatic water faucet) 16 of a sink 15. Regarding the details of this, an explanation will be given in reference to FIGS. 1-12. As shown in FIG. 1, the sink 15 according to the present exemplary embodiment is provided with a counter 155 on which a bowl 151 recessed in a concave shape is provided and the water faucet 16 having a water discharge port 168. The water faucet 16 is installed in a standing manner on a counter top 156 that forms the upper surface of the counter 155. A drainage port 152 for draining water is disposed at the deepest part of the bottom of the bowl 151.

The water faucet 16 has an approximately columnar body portion 160 installed in a standing manner on the counter top 156 and a base portion 161 serving as a pedestal for this body portion 160. The body portion 160 is supported by the base portion 161 in a state where the body portion 160 is inclined toward the bowl 151. An approximately cylindrical water discharge portion 162 is attached to the side of the body portion 160 facing the bowl 151, and the water discharge port 168 is open at the tip of the water discharge portion 162. A filter plate 165 forming a detection surface of the person-detecting sensor 1 is arranged on the side surface of the body portion 160 above this water discharge portion 162. The filter plate 165 is a resin-made filter that selectively transmits light in an infrared region. Water is supplied to the water discharge port 168 of the water faucet 16 through a water supply channel inside a water supply pipe 12. A water discharge valve (electromagnetic valve) including a solenoid (water supply control unit) 11 is provided in the water supply channel, and the water supply channel is opened and closed by the water discharge valve.

Figure 2:
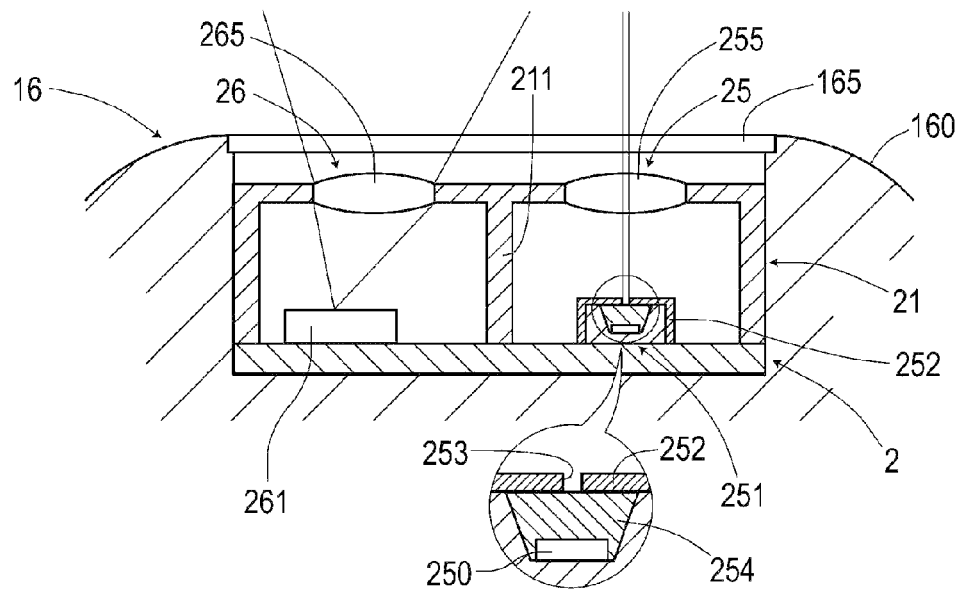
FIG. 2 is a cross-sectional view illustrating a cross-sectional structure of a sensor unit in the first exemplary embodiment (A-A line arrow cross-sectional view in FIG. 1)

As shown in FIGS. 1 and 2, the person-detecting sensor 1 according to the present exemplary embodiment comprises a sensor unit 2 incorporated in the water faucet 16 and a control unit 3 that controls the sensor unit 2. An automatic water supply apparatus is formed by a combination of this person-detecting sensor 1 and the solenoid 11 in the sink 15.

As shown in FIGS. 1 and 2, the sensor unit 2 is a unit where an LED element 251 and a line sensor (imaging element) 261 are housed in a housing 21 and operates when receiving power supply from the control unit 3. In the sensor unit 2, a light-emitting unit 25 and an imaging unit 26 are arranged in parallel facing the filter plate 165 of the water faucet 16. The light-emitting unit 25 that emits infrared light is provided with the LED element 251 and a light projection lens 255. The imaging unit 26 is provided with the line sensor 261 and a condenser lens 265. The light-emitting unit 25 and the imaging unit 26 are arranged offset in a horizontal direction (predetermined direction) across a partition 211 having a light shielding property.

As shown in FIG. 2, the LED element 251 is a light-emitting element in which an LED chip 250 is mounted in a cavity of a package substrate. The LED chip 250 in the cavity is sealed by a transparent resin 254. In the light-emitting unit 25, the LED element 251 is covered by an element case 252 having a light shielding property on which a slit hole 253 is provided along a longitudinal direction (a vertical direction). This light-emitting unit 25 allows sharp slit light, whose spread angle in a horizontal direction is reduced, to be incident toward a detection object.

Figure 3:
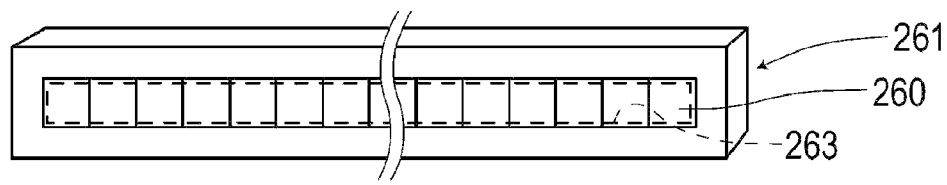
FIG. 3 is a perspective view illustrating a line sensor in the first exemplary embodiment.

As shown in FIGS. 2 and 3, the line sensor 261 is a one-dimensional imaging sensor in which pixels 260 that convert a received-light quantity into an electrical physical quantity are arrayed in a linear manner. The line sensor 261 has 64 pixels 260 as effective pixels. In the line sensor 261, a light-receiving region 263 is formed by these 64 pixels 260. In the light-receiving region 263, the pixels 260 are arrayed in an offset direction of the light-emitting unit 25 and the imaging unit 26. The line sensor 261 is provided with an electronic shutter (not shown) and is capable of adjusting light-receiving (exposure) time by using this electronic shutter. Every time the line sensor 261 performs a light-receiving operation, the line sensor 261 outputs one-dimensional imaging data where pixel values of 256 tones that express a received-light quantity are arrayed in the order of respective pixels 260.

In the sensor unit 2 according to the present exemplary embodiment, the line sensor 261 is incorporated in such a manner that the longitudinal direction of the light-receiving region 263 matches the offset direction of the light-emitting unit 25 and the imaging unit 26. This sensor unit 2 is incorporated in the water faucet 16 such that a bowl surface 150 (an inner circumferential surface of the bowl 151) is included in at least a portion of an imaging range of the line sensor 261.

Figure 4:
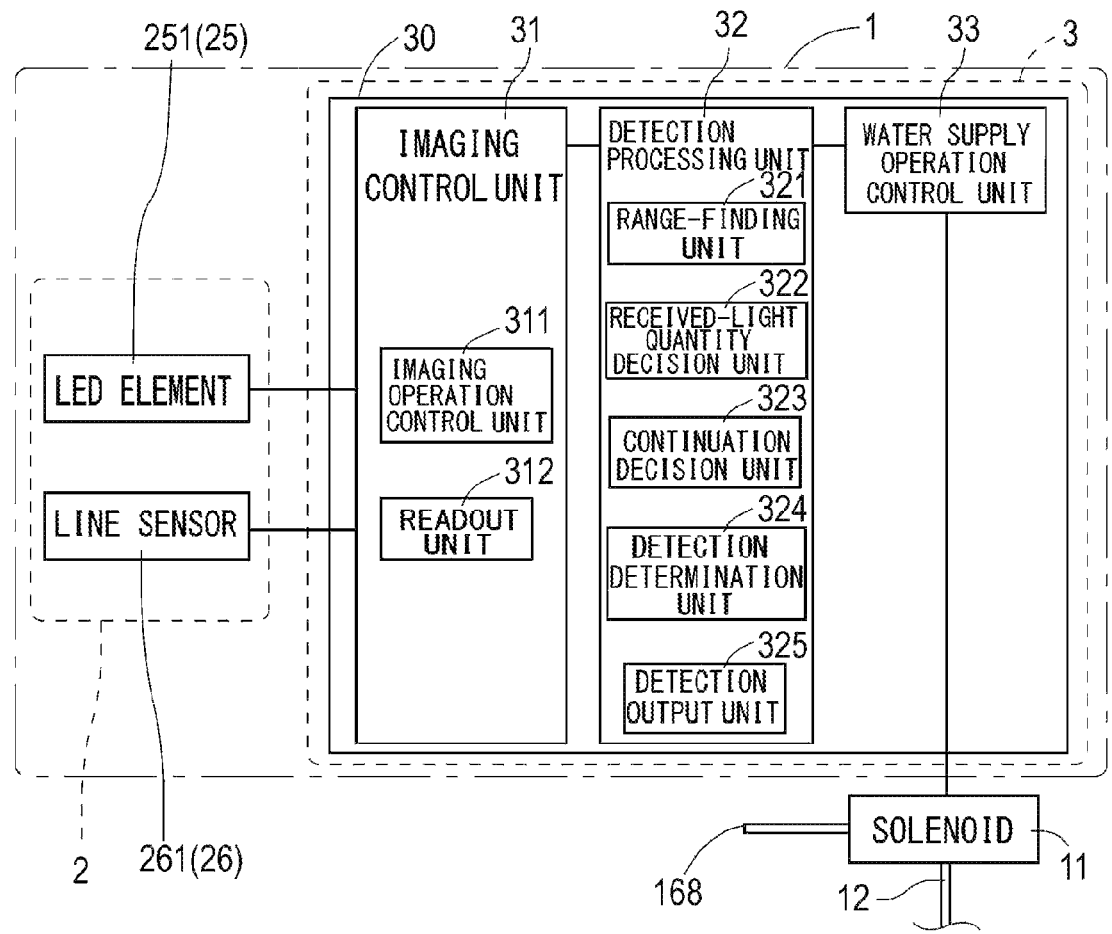
FIG. 4 is a block diagram illustrating a system configuration of a person-detecting sensor in the first exemplary embodiment.

As shown in FIGS. 1 and 4, the control unit 3 is a unit that controls the sensor unit 2 and the solenoid 11 and operates by power supplied from a commercial power source. This control unit 3 is provided with a control substrate 30 that controls the sensor unit 2 and the solenoid 11. In the control substrate 30, an imaging control unit 31 that controls the line sensor 261 and the LED element 251, a detection processing unit 32 that performs a detection process, and a water supply operation control unit 33 that controls the solenoid 11 are provided.

The imaging control unit 31 is provided with functions serving as an imaging operation control unit 311 that controls an imaging operation carrying out light emission by the LED element 251 and light receiving by the line sensor 261 and a readout unit 312 that reads out imaging data (a received-light waveform that represents the distribution of a received-light quantity of each of the pixels 260) from each of the pixels 260 of the line sensor 261. The imaging operation control unit 311 controls the line sensor 261 such that an intermittent operation where an operation period and a non-operation period appear alternately is performed. The imaging operation control unit 311 stops power supply to the line sensor 261 until a predetermined interval time (500 milliseconds in the present exemplary embodiment) passes after a previous operation period has ended so as to set a non-operation period and restarts the power supply when the interval time has passed so as to set an operation period.

Figure 5:
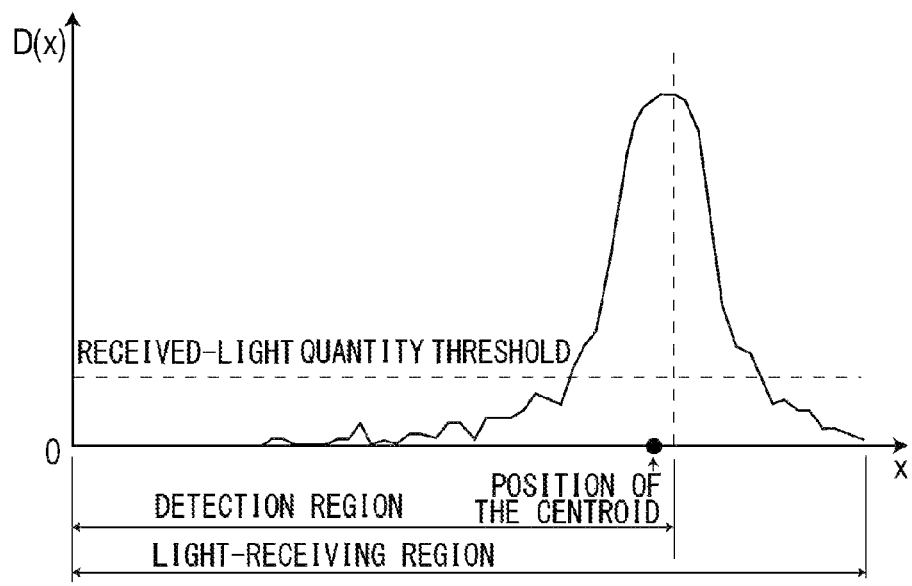
FIG. 5 is a diagram illustrating a received-light waveform of light that is diffusely reflected by a detection object.

The imaging operation control unit 311 according to the present exemplary embodiment performs the exposure of (the receiving of light by) the line sensor 261, which is synchronized with the emission of light by the LED element 251, and the exposure of the line sensor 261 with no emission of light in a row and obtains, for each of the pixels, the difference of the received-light quantity between the two exposure occasions. In a difference of a received-light waveform for each pixel, the influence of surrounding light is suppressed, and components of reflected light resulting from LED light are extracted. FIG. 5 shows an example of a received-light waveform that is acquired when diffusely-reflected light subject to detection is incident. A horizontal axis x in the figure represents a pixel number (pixel position), and a vertical axis $D(x)$ represents the received-light quantity (pixel value) of a pixel of a pixel number x.

The detection processing unit 32 has functions serving as a range-finding unit 321 that decides whether a distance to a detection object falls within a detection distance range (see FIG. 7), a received-light quantity decision unit 322 that decides whether the received-light quantity of reflected light is equal to or greater than a received-light quantity threshold, a continuation decision unit 323 (use decision unit) that decides whether an in-use state where a detection object is present is ongoing, a detection determination unit 324 that determines under detection state or non-detection state, and a detection output unit 325 that outputs a detection signal (sensor signal) under the detection state.

The detection determination unit 324 makes a final determination regarding whether a state is under detection state or non-detection state based on respective decision results obtained by the range-finding unit 321 and the received-light quantity decision unit 322. The detection determination unit 324 determines the detection object to be under detection state when the distance to the detection object is decided to be within the detection distance range by the range-finding unit 321 and the received-light quantity is decided to be equal to or greater than the received-light quantity threshold (a first threshold or a second threshold) by the received-light quantity decision unit 322.

Using the received-light waveform (received-light quantity distribution for each pixel) shown in FIG. 5 that is acquired by an imaging operation, the range-finding unit 321 performs a decision regarding the distance to the detection object. As a first step, the range-finding unit 321 first performs a ranging process for identifying position where reflected light is incident in the light-receiving region 263. In the present exemplary embodiment, the position of the centroid of the received-light waveform is treated as the incident position of the reflected light. Then, as a second step (a ranging decision routine), the range-finding unit 321 decides whether the distance to the detection object falls within the detection distance range by deciding whether the position of the centroid is located within a predetermined detection region (see FIG. 6).

The control unit 3 according to the present exemplary embodiment has a memory area (not shown) that stores the position of the centroid identified by the ranging process. Two previous positions of the centroid are stored in this memory area, and the older data is deleted and then rewritten with new data for the position of the centroid every time a new position of the centroid is identified.

Figure 6:
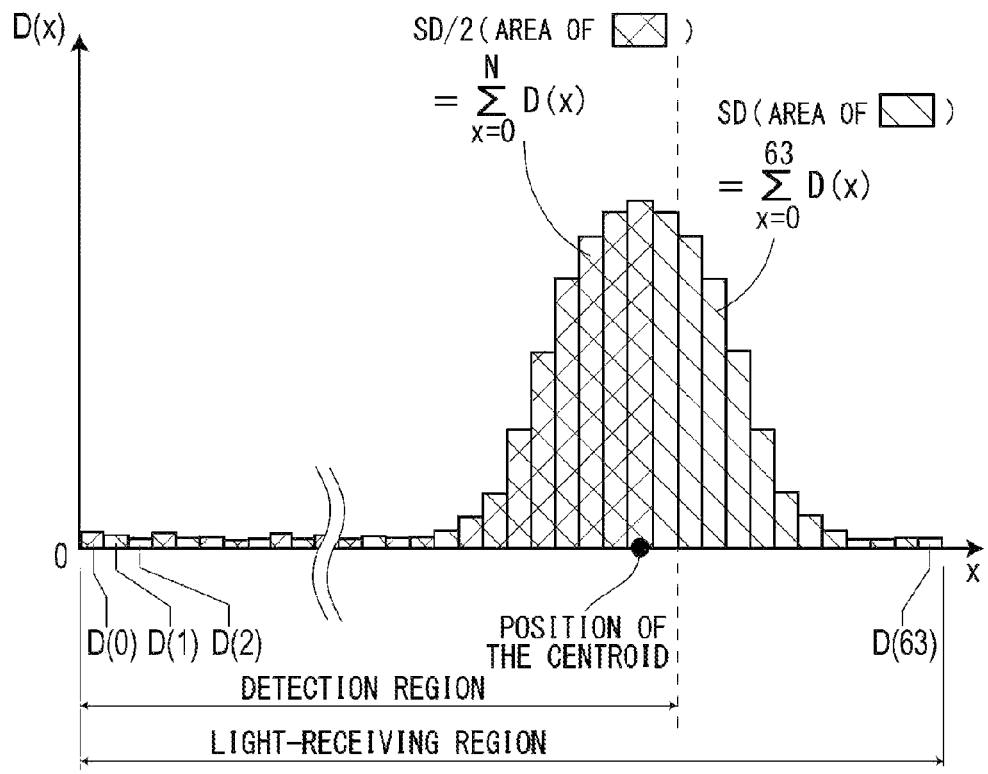
FIG. 6 is an illustrative view of a method of calculating the position of the centroid (incident position) of the received-light waveform in the first exemplary embodiment.

An explanation will be given of a method for identifying the position of the centroid in the above first step in reference to FIG. 6, which schematically shows the distribution of a received-light quantity of each pixel. In this first step, in order to identify the position of the centroid of the received-light waveform, the range-finding unit 321 first integrates received-light quantity data $D(x)$ of each of pixels that constitute the received-light waveform so as to calculate the sum SD of the pixel values of the 64 pixels. This sum SD corresponds to the area of a region indicated by hatching with diagonal lines running to the lower right in FIG. 6. Then, the range-finding unit 321 continues to integrate the pixel values of the respective pixels 260 in order from a pixel on the extreme left in the light-receiving region 263 whose pixel number is zero and identifies a pixel position (shown by a black filled circle) at which an integrated value reaches SD/2 as the position of the centroid of the received-light waveform. In the present exemplary embodiment, the pixel position at which the integrated value becomes SD/2 is obtained in sub-pixel accuracy of a 1/10 Pixel Using the Slope of the Integrated Value. In FIG. 6, the integrated value of SD/2 corresponds to the area of a region indicated by hatching with diagonal lines running to the upper right. This region is understood as a region with cross-hatching in the region for the sum SD.

Figure 7:
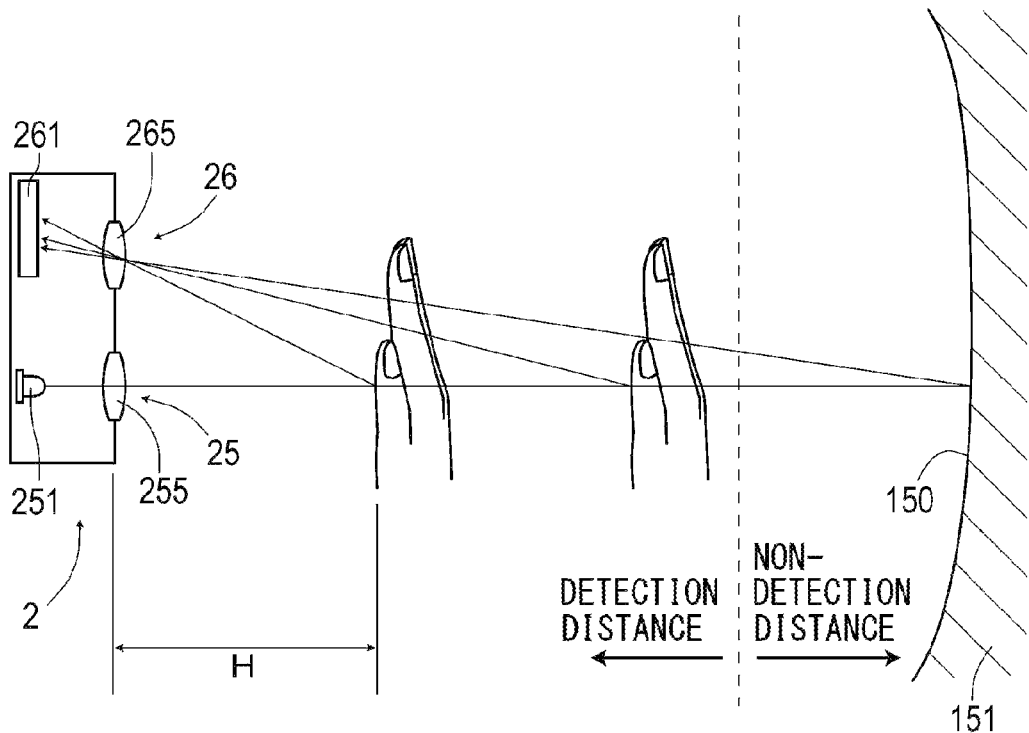
FIG. 7 is an illustrative view of the principle of triangulation in the first exemplary embodiment.

In the second step, a determination is made whether the position of the centroid, which indicates the incident position of the reflected light, is located within the detection region shown in FIG. 5 and FIG. 6. This detection region is set as shown in the following on the ground of the principle of triangulation using the sensor unit 2. A positional relationship of the sensor unit 2, the bowl surface 150, and a user's hand in the sink 15 according to the present exemplary embodiment can be schematically expressed as shown in FIG. 7. In the case of a component of reflected light from the hand, which is a detection object, in LED light being incident on the line sensor 261, the incident position of the component varies depending on a distance H to the detection object. The shorter the distance H becomes, the farther the incident position of the reflected light incident on the line sensor 261 is located from the LED element 251. The longer the distance H becomes, the closer the incident position of the reflected light is located to the LED element 251. As described, the incident position of reflected light with respect to the line sensor 261 is proportional to the distance to the detection object and can serve as an index (a distance index) that indicates the degree of the distance. The detection region (FIG. 5 and FIG. 6) set inside the light-receiving region 263 (FIG. 3) is a region that corresponds to the detection distance subject to detection (FIG. 7). As described above, the position of the centroid that has been calculated is treated as the incident position, and the determination as to whether the position of the centroid is within the detection region means completely the same as the determination as to whether the distance to the detection object involving the generation of reflected light is within the detection distance range shown in FIG. 7.

The received-light quantity decision unit 322 performs a determination by a threshold regarding a received-light quantity. The received-light quantity subject to the determination by a threshold is the received-light quantity of a centroid pixel falling at the position of the centroid. Instead of the received-light quantity of the centroid pixel, the maximum received-light quantity in the received-light waveform may be subject to the determination by a threshold, or the sum SD of the received-light quantities (pixel values) of the respective pixels that constitute the received-light waveform may be subject to the determination by a threshold. In particular, in the water faucet 16 according to the present exemplary embodiment, a received-light quantity threshold varies depending on whether an in-use state is ongoing since the start of water discharge (a period when a state where the detection object is present is ongoing) or water is being stopped. For example, during a period when water continues to be discharged so as to be accumulated, the received-light quantity of reflected light tends to become small due to scattered reflection of light caused by water bubbles and the like. In consideration of such a tendency, in the received-light quantity decision unit 322 according to the present exemplary embodiment, control is employed for lowering the received-light quantity threshold during a period when the in-use state where the detection object is present is decided to be ongoing by the continuation decision unit 323 after water discharge is started upon the detection determination unit 324 determinating the detection object to be under detection state.

Figure 8A:
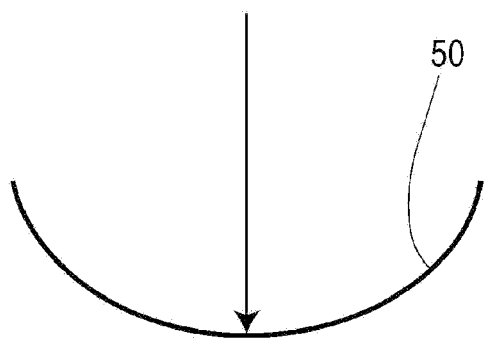
FIG. 8A is an illustrative view showing a path of LED light in a state that occurs immediately before water discharge in the first exemplary embodiment.
Figure 8B:
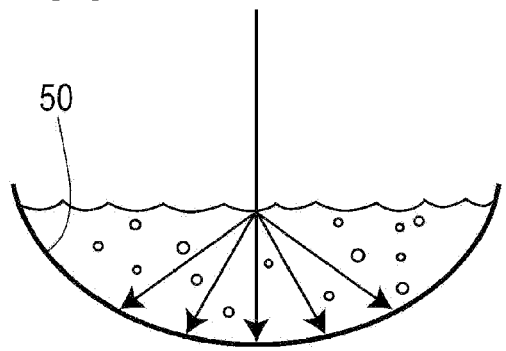
FIG. 8B is an illustrative view showing a path of LED light in a state that occurs after the start of water discharge in the first exemplary embodiment.
Figure 9:
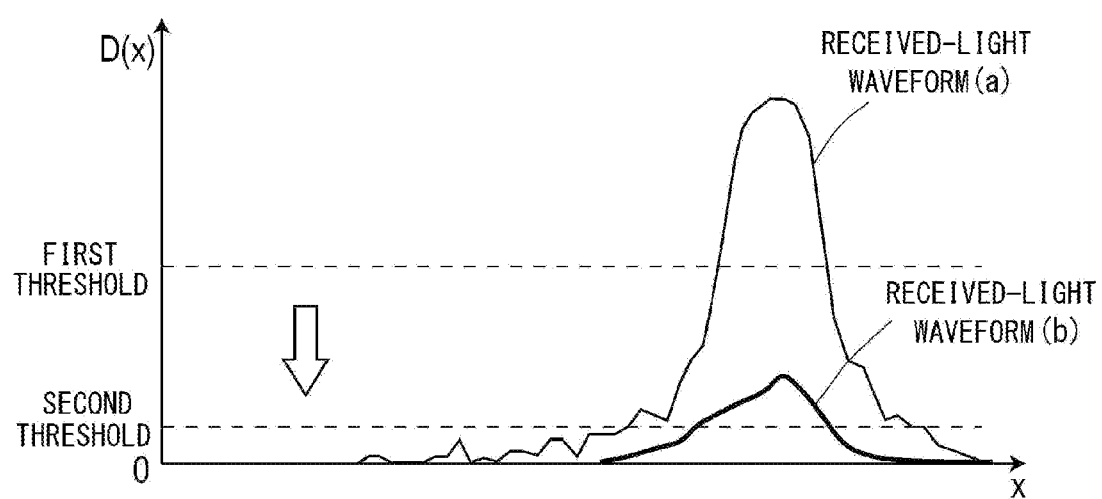
FIG. 9 is a graph comparing a received-light waveform at the time of the start of discharging water with a received-light waveform during the accumulation of water in the first exemplary embodiment.
Figure 10:
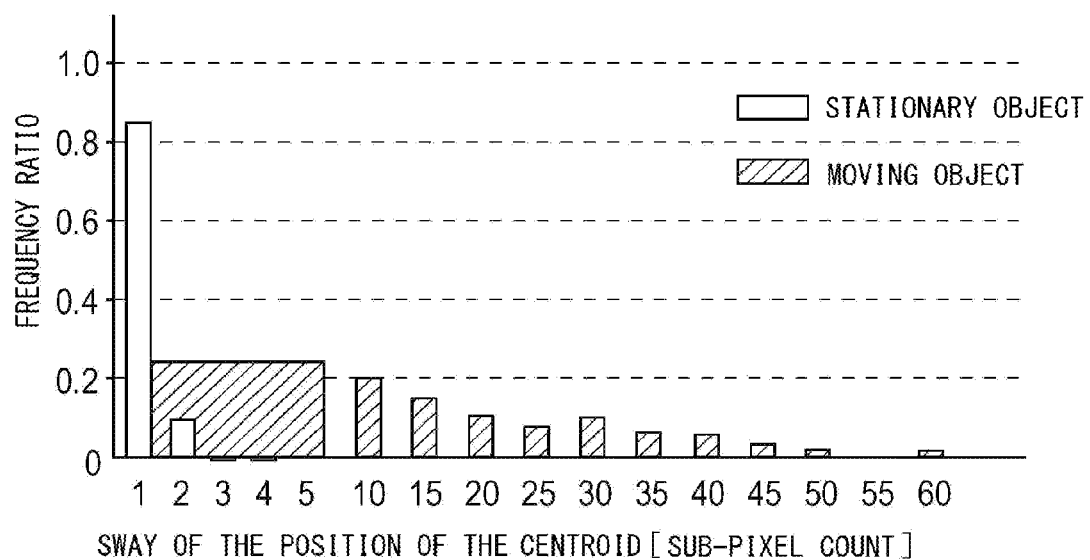
FIG. 10 is a graph illustrating frequency distribution of sway of the position of the centroid in the first exemplary embodiment.

An explanation will be given of the setting of a first threshold, which is a received-light quantity threshold that is applied when water is being stopped or the like, and a second threshold, which is a received-light quantity threshold that is applied when the in-use state is ongoing after the start of water discharge. As shown in FIG. 8 showing a hollow 50 formed by the palms of the hands, a path of LED light is completely different in a state (a) that occurs immediately before water discharge and in a state (b) where water is being accumulated after the start of water discharge. In the state (a) that occurs immediately before water discharge without the accumulation of water, LED light travels in a straight line and is diffusely reflected at the surface of the palms. Meanwhile, in the state (b) where water is being accumulated, LED light travels while repeating refraction and reflection due to air bubbles in the water that is being accumulated and becomes diffused. Because of this, the level of a received-light quantity is greatly different in a received-light waveform (a) obtained in the state (a) that occurs immediately before water discharge without the accumulation of water and in a received-light waveform (b) obtained in the state (b) where water is being accumulated, as shown in FIG. 9. Obviously, with regard to the received-light quantity of a centroid pixel, the received-light quantity also becomes remarkably smaller in the state (b) where water is being accumulated.

If the first threshold is directly applied during the accumulation of water, it is likely that the current state is determined to be under the non-detection state due to a decrease in the received-light quantity and that water is thus stopped erroneously. Thus, in the present exemplary embodiment, after the start of water discharge, a received-light quantity that is below 50 percent of the first threshold is set as the second threshold applied when the in-use state is ongoing. By setting such a second threshold, the possibility of water being stopped despite that water is being accumulated can be suppressed beforehand when the in-use state after the start of water discharge is ongoing.

Figure 11:
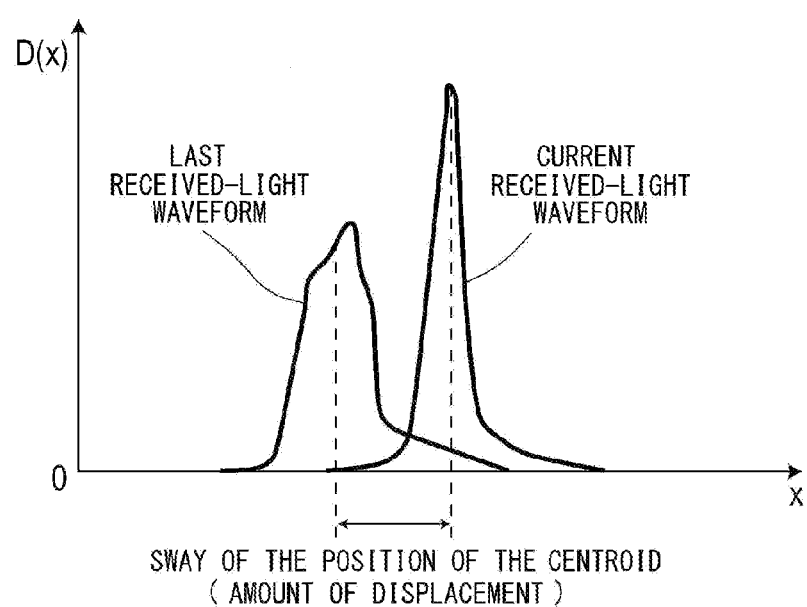
FIG. 11 is a diagram illustrating the sway of the position of the centroid in the first exemplary embodiment.

The continuation decision unit 323 detects sway of the position of the centroid of a received-light waveform (a temporal change in the position of the centroid with sub-pixel accuracy of a 1/10 pixel) so as to detect whether a moving object is present and decides, based on the result of the detection, whether the in-use state is ongoing. In the present exemplary embodiment, a threshold for moving object decision is set to be five sub-pixels based on experimental knowledge (see FIG. 10) regarding the person-detecting sensor 1 according to the present exemplary embodiment where sway of the position of the centroid exceeds five sub-pixels in the majority of moving objects while the sway of the position of the centroid of reflected light by a stationary object is around one to two sub-pixels. A horizontal axis represents a sub-pixel count, and a vertical axis represents ratio of the frequency of occurrence with respect to the entire frequency in FIG. 10. The continuation decision unit 323 decides, for two received-light waveforms that are temporally continuous as shown in FIG. 11, that there is a moving object when the sway of the position of the centroid obtained in sub-pixel accuracy exceeds five sub-pixels and decides that the in-use state is ongoing based on this.

When the current state is determined to be under the detection state by the detection determination unit 324, the detection output unit 325 outputs a detection signal to the water supply operation control unit 33. Upon receiving the detection signal from the detection output unit 325, the water supply operation control unit 33 opens the water supply channel by controlling the solenoid 11 so that water is discharged through the water discharge port 168 of the water faucet 16 to the inside of the bowl 151. On the other hand, when the input of the detection signal from the detection output unit 325 is stopped, the water supply operation control unit 33 blocks the water supply channel by controlling the solenoid 11 so that water from the water faucet 16 is stopped. As described, the solenoid 11 performs the switching of discharging and stopping of water from the water faucet 16 by using a sensor signal output from the detection output unit 325 of the person-detecting sensor 1.

Figure 12:
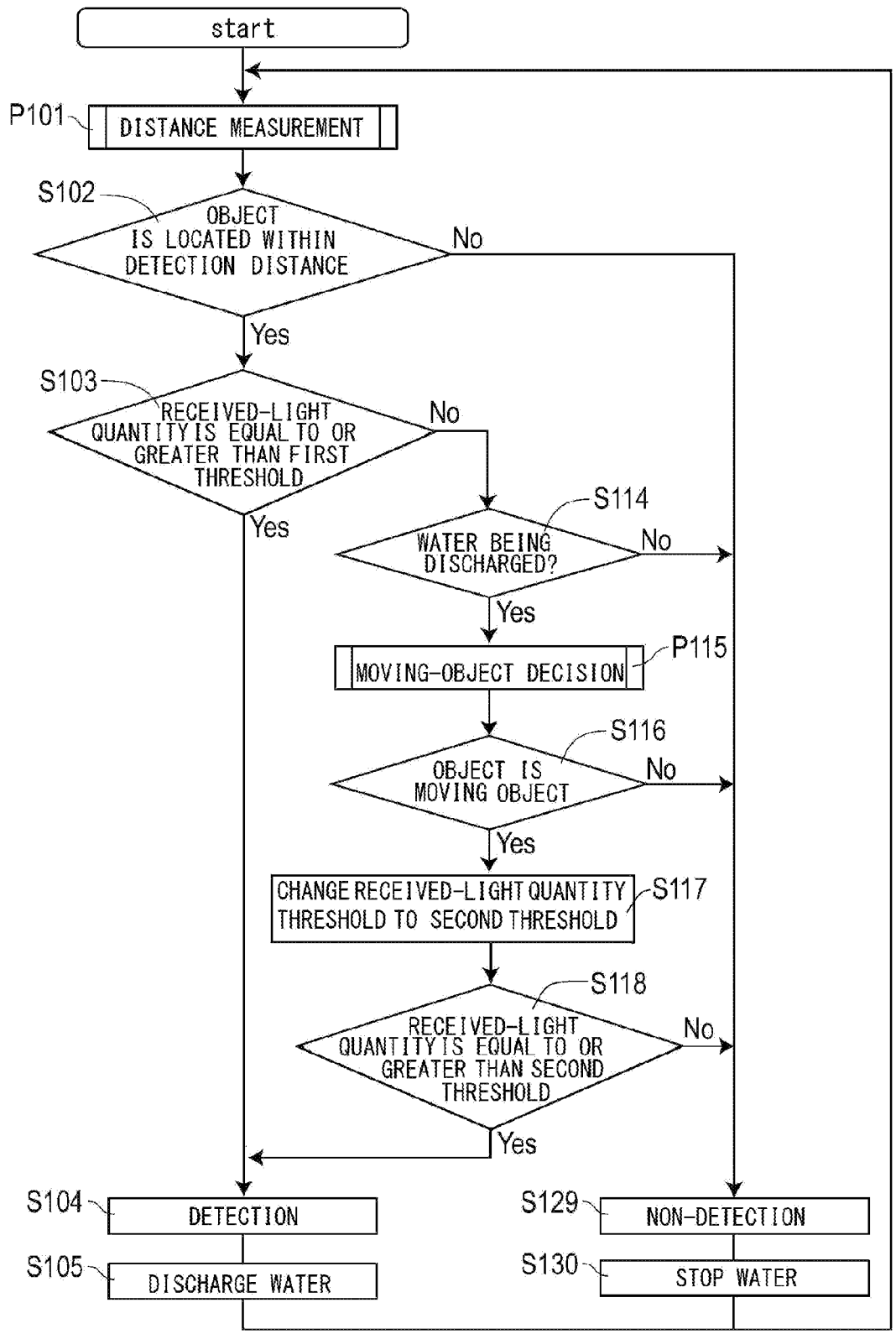
FIG. 12 is a flow diagram illustrating the flow of a detection process by the person-detecting sensor in the first exemplary embodiment.

Next, an explanation will be made regarding the flow of a detection process by the person-detecting sensor 1 according to the present exemplary embodiment configured as described above in reference to a flow diagram shown in FIG. 12. In the detection process, the control unit 3 first performs a distance measurement process P101 where reflected light from a detection object is used. This distance measurement process P101 is started by a series of imaging operations by the control by the control unit 3. The imaging control unit 31 of the control unit 3 performs the exposure of (the receiving of light by) the line sensor 261, which is synchronized with the emission of light by the LED element 251, and the exposure of the line sensor 261 with no emission of light in a row and obtains, for each of the pixels, the difference of the received-light quantity D (x) between the two occasions of the receiving of light. According to this series of imaging operations, the received-light waveform (FIG. 5) where the difference of the received-light quantity D (x) for each of the pixels is distributed can be obtained. In this received-light waveform, the influence of surrounding light is suppressed by obtaining the difference in the received-light quantity, and components of reflected light resulting from LED light are extracted with high accuracy.

The range-finding unit 321 of the control unit 3 identifies the position of the centroid, which is used for a distance index value for a distance to the detection object, in sub-pixel accuracy of a 1/10 pixel. As described above, the control unit 3 stores data for the two latest positions of the centroid, and the control unit 3 deletes the older data for the position of the centroid and then performs rewriting with new data when a new position of the centroid is identified.

The range-finding unit 321 of the control unit 3 uses the position of the centroid of reflected light identified as the distance index value so as to decide whether the distance to the detection object falls within the detection distance range (S102). As described above, by determining whether the position of the centroid of the received-light waveform falls in the detection area (see FIG. 5), the range-finding unit 321 of the control unit 3 according to the present exemplary embodiment decides whether the distance to the detection object falls within the detection distance range (see FIG. 7).

When the distance to the detection object does not fall within the detection distance range (S102: NO), the detection determination unit 324 of the control unit 3 immediately determines the detection object to be under the non-detection state (S129). On the other hand, when the distance to the detection object falls within the detection distance range (S102: YES), the received-light quantity decision unit 322 performs a determination, by a threshold, of whether the received-light quantity of a centroid pixel is equal to or greater than a predetermined first threshold (received-light quantity threshold) (S103). When the received-light quantity of the centroid pixel is equal to or greater than the first threshold (S103: YES), the detection determination unit 324 determines the detection object to be under the detection state (S104) and starts or continues water discharge (S105) by the output of a detection signal from the detection output unit 325. Then, the imaging control unit 31 performs a subsequent imaging operation.

On the other hand, when the received-light quantity of the centroid pixel is less than the first threshold (S103: NO), the continuation decision unit 323 of the control unit 3 performs the determination of whether water is being discharged (in the detection state) (S114). When the continuation decision unit 323 determines that water is not being discharged (S114: NO), the detection determination unit 324 of the control unit 3 keeps the determination indicating that the current state is under the non-detection state (S129). On the other hand, when the continuation decision unit 323 determines that water is being discharged (S114: YES), the continuation decision unit 323 performs a moving-object decision process P115.

In this moving-object decision process P115, determination is made by a threshold regarding whether the difference (sway of the centroid) between the last position of the centroid stored in the control unit 3 and the newly-identified position of the centroid is five sub-pixels or more. The continuation decision unit 323 of the control unit 3 decides that there is a moving object when the temporal difference between the positions of the centroid exceeds five sub-pixels and decides that there is no moving object when the difference is five sub-pixels or less.

When the continuation decision unit 323 of the control unit 3 decides that there is a moving object (S116: YES), the continuation decision unit 323 decides that the in-use state is ongoing. The received-light quantity decision unit 322 changes the received-light quantity threshold to a second threshold that is lower than the first threshold (S117) and then performs a determination by a threshold regarding the received-light quantity of the centroid pixel again. When the received-light quantity of the centroidpixel is equal to or greater than the second threshold (S118: YES), the detection determination unit 324 keeps the determination indicating that the state is under the detection state (S104). On the other hand, when the received-light quantity of the centroid pixel is less than the second threshold (S118: NO), the detection determination unit 324 changes the determination to indicate the non-detection state from the determination indicating the detection state according to the result of the determination by a threshold, which is S103: NO, indicating that the received-light quantity is less than the first threshold (S129). The detection output unit 325 stops water or maintains a state where water is stopped by stopping the output of the detection signal or by maintaining a state where the detection signal is not output (S130).

As described above, a person-detecting sensor 1 included in an automatic water faucet 16 according to the present exemplary embodiment lowers a received-light threshold during a period when an in-use state is determined to be ongoing by moving body detection after the start of water discharge. For example, in a usage situation where a hollow is formed by putting the palms of the hands together so as to accumulate water, even when LED light is diffused due to repeated reflection and refraction caused by air bubbles produced during the accumulation of water and the received-light quantity of the reflected light is lowered due to the diffusion of the LED light, the possibility that the current state is erroneously determined to be under the non-detection state can be avoided beforehand. If such an erroneous determination can be avoided, inconvenience such as a situation where water is stopped during the accumulation of water is less likely to occur.

In the present exemplary embodiment, as shown in the step S118 shown in FIG. 12, the state is immediately determined to be under the non-detection state when the received-light quantity falls below the second threshold. Alternatively, in processes that are performed repeatedly in the figure, the state may be determined to be under the non-detection state when the received-light quantity falls below the second threshold temporally twice in a row, and the detection state may be maintained even when the received-light quantity falls below the second threshold only for once in a temporally-isolated manner.

In the present exemplary embodiment, a received-light quantity that is below 50 percent of the first threshold is set as the second threshold. The ratio of the magnitude of the first threshold to the magnitude of the second threshold can be changed appropriately. The second threshold may be a value that is smaller than the first threshold.

The present exemplary embodiment represents an example where a person-detecting sensor 1 is employed in a water faucet 16 of a sink 15. Alternatively, the water faucet 16 may be a water faucet for a kitchen. In the present exemplary embodiment, the sensor unit 2 and the control unit 3 are formed separately. Alternatively, the sensor unit 2 and the control unit 3 may be formed in an integral manner and housed in the water faucet 16. Although the person-detecting sensor 1 according to the present exemplary embodiment includes the water supply operation control unit 33, the water supply operation control unit 33 can be formed separately. In the present exemplary embodiment, an example is shown where the line sensor 261 in which pixels are arrayed one-dimensionally is employed as an imaging element. For the imaging element, an area sensor in which pixels are arrayed two-dimensionally may be employed. The water supply control unit may be capable of performing the switching of discharging and stopping of water from the water faucet 16 by the opening and closing of the water supply channel while using a sensor signal that is output from the detection output unit 325 of the person-detecting sensor 1. The water supply control unit may be a water discharge valve including a stepping motor or the like instead of a water discharge valve that includes a solenoid.

In the present exemplary embodiment, the position of the centroid of a received-light waveform is obtained for identifying the incident position of reflected light. Instead of the position of the centroid, the position of the peak of the received-light waveform may be identified as an incident position. Further, although the position of the centroid is calculated by a simple calculation in the present exemplary embodiment, the position of the centroid may be calculated in a mathematically rigorous manner if there is a margin in calculation processing capacity.

Second Exemplary Embodiment

The present exemplary embodiment represents an example where the configuration of a continuation decision unit (reference numeral 323 in FIG. 4) is changed on the basis of a person-detecting sensor according to the first exemplary embodiment. Regarding the details of this, an explanation will be given in reference to FIG. 13. The continuation decision unit according to the first exemplary embodiment makes a decision of whether the in-use state is ongoing based on a moving-object decision. On the other hand, the continuation decision unit according to the present exemplary embodiment presumptively decides that the in-use state is ongoing until a preset prescribed period of time (a predetermined period of time: two seconds in the present exemplary embodiment) passes after water discharge is started in response to the switching of the state from the non-detection state to the detection state when the detection determination unit determines the detection object to be under the detection state.

Figure 13:
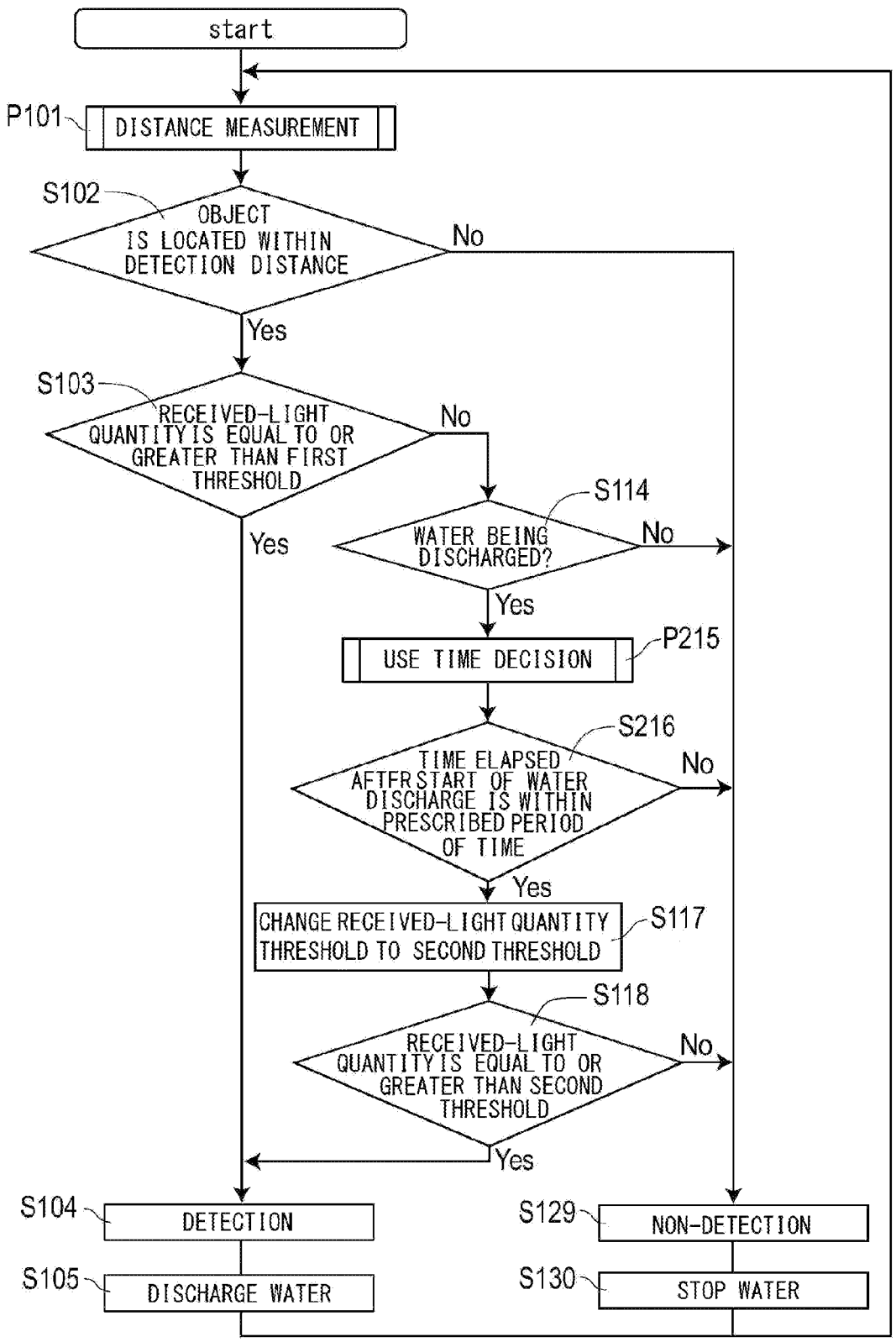
FIG. 13 is a flow diagram illustrating the flow of a detection process by a person-detecting sensor in a second exemplary embodiment.

An explanation will be made regarding the flow of a detection process by a person-detecting sensor according to the present exemplary embodiment in reference to FIG. 13. An explanation will be made mainly regarding differences from the first exemplary embodiment. In a use time decision process P215 that is performed when the received-light quantity is decided to be less than the first threshold during water discharge (S103: NO→S114: YES), the continuation decision unit makes a decision of whether a time elapsed after the start of water discharge is within the prescribed period of time (S216). When the time elapsed exceeds the prescribed period of time (S216: NO), the determination made by the detection determination unit 324 is changed to indicate the non-detection state from the determination indicating the detection state according to the result of the determination by a threshold, which is S103: NO, indicating that the received-light quantity is less than the first threshold (S129).

On the other hand, when the time elapsed falls within the prescribed period of time (S216: YES), the received-light quantity threshold is changed to the second threshold by the received-light quantity decision unit 322 (S117). When the received-light quantity of the centroidpixel is equal to or greater than the second threshold (S118: YES), the determination made by the detection determination unit 324 is maintained (S104). When the received-light quantity of the centroid pixel is less than the second threshold (S118: NO), the determination made by the detection determination unit 324 is changed to indicate the non-detection state from the determination indicating the detection state (S129).

In the detection process according to the present exemplary embodiment, a time point at which water discharge is started in response to the switching of the determination from the determination indicating the non-detection state to the determination indicating the detection state is set as a time used as the reference for the decision. During a period when a time elapsed from that time point falls within the prescribed period of time (two seconds), the in-use state is presumptively decided to be ongoing, and the received-light quantity threshold is lowered from the first threshold to the second threshold, thus loosing criteria for determining the detection state. For example, when accumulating water in the palms of the hands in order to wash face and so forth, scattered reflection occurs by air bubbles and the like in the accumulated water, and the received-light quantity of reflected light is thus lowered. If the received-light quantity threshold is lowered until the prescribed period of time passes after the start of water discharge on the assumption that the in-use state is ongoing, water discharge can be continued even when the received-light quantity of reflected light becomes lowered due to the diffusion of LED light by accumulated water.

In the present exemplary embodiment, the prescribed period of time is set to be two seconds. This prescribed period of time can be changed appropriately. An operation unit may be provided for adjusting this prescribed period of time so that a user is able to set the predetermined period of time according to his/her preference. The other features, operations and effects are the same as those described in the first exemplary embodiment.

While the specific examples of the present invention have been explained in detail as shown in the exemplary embodiments, these specific examples merely disclose an example of technologies encompassed in the scope of the claims. Needless to say, the scope of the claims should not be interpreted in a limited manner by the features, the numerical values, and the like shown in the specific examples. The scope of the claims encompass technologies where the specific examples are modified, changed, or appropriately combined in various ways using publicly-known technologies, knowledge of those skilled in the art, and the like.

According to the present invention, an imaging element for which a CCD or a CMOS is used can be used as an imaging element that is applied to the person-detecting sensor according to the present invention. There are at least the following two methods as methods for a range-finding unit provided in a person-detecting sensor according to the present invention to decide whether a distance to a detection object falls within a predetermined detection distance range. The first method is a method where the distance to the detection object is actually obtained from an incident position and whether the distance falls within the detection distance range is decided. The second method is a method where a region that corresponds to the predetermined detection distance range is set in a light-receiving region and whether the distance to the detection object falls within the predetermined detection distance range is decided by determining whether the incident position is located in this region.

A continuation decision unit provided in a person-detecting sensor according to a preferred embodiment of the present invention detects a temporal change of reflected light so as to detect the presence of a moving object and decides that a state of the detection object being present is ongoing when the continuation decision unit detects the moving object (claim 2). The moving body detection allows for the determination of a state where a detection object is present with high certainty. For example, a moving body is highly likely to be detected since reflected light is likely to change in time due to scattered reflection caused by air bubbles in accumulated water during the accumulation of water in the palms of the hands.

A continuation decision unit provided in a person-detecting sensor according to a preferred embodiment of the present invention decides that the state of the detection object being present is ongoing during a predetermined period after water discharge is started upon the detection determination unit determining the detection object to be under the detection state (claim 3). The use of an automatic water faucet is very likely to continue over a certain amount of time after water discharge is started. If the state of the detection object being present is decided to be ongoing over a predetermined period of time after water discharge is started, an erroneous decision can be avoided, for example, even when the received-light quantity of reflected light becomes decreased due to scattered reflection caused by air bubbles or the like during the accumulation of water using the palms of the hands, and the stopping of water that is not intended by a user can be avoided beforehand.

What is claimed is:

1. A person-detecting sensor for an automatic water faucet, and for detecting a person, as a detection object, located within a predetermined detection distance range, the person-detecting sensor comprising:
    an imaging unit that includes an imaging element in which pixels are arranged either one-dimensionally or two-dimensionally;
    a light-emitting unit disposed offset from the imaging unit in a predetermined direction, wherein
        the imaging unit receives reflected light generated by light incident from the light-emitting unit;
    an imaging operation control unit that controls an imaging operation carrying out light emission by the light-emitting unit and light receiving by the imaging unit;
    a readout unit that reads out the respective received-light quantities of pixels constituting the imaging element;
    a range-finding unit that identifies position where the reflected light is incident in a light-receiving region, which is a region in which pixels constituting the imaging element are arrayed in the predetermined direction, and that decides whether distance to the detection object derivable by the principle of triangulation from the incident position falls within the predetermined detection distance range;
    a received-light quantity decision unit that performs a received-light quantity determination according to a threshold for the received-light quantity read out by the readout unit, the received-light quantity decision unit deciding whether the received-light quantity is smaller than, or is equal to or greater than, a first threshold as a predetermined received-light quantity threshold;
    a detection determination unit that determines a detection object to be present as under detection when distance to the detection object is decided by the range-finding unit to fall within the predetermined detection distance range and the received-light quantity is decided by the received-light quantity decision unit to be equal to or greater than the first threshold as the received-light quantity threshold; and
    a continuation decision unit that after the automatic water faucet starts water discharge in response to the detection determination unit determining a detection object to be under detection, either
        determines whether the detection object is a moving body by detecting temporal change in reflected light received by the imaging unit, or
        determines whether elapsing time after start of water discharge is within a prescribed period of time; wherein
    when the received-light quantity decision unit decides that the received light quantity is smaller than the first threshold, and when after the automatic water faucet starts water discharge either the continuation decision unit determines that the detection object is the moving body or the continuation decision unit determines that the elapsing time is within the prescribed period of time, the received-light quantity decision unit changes the first threshold to a second threshold lower than the first threshold.

2. A person-detecting sensor as set forth in claim 1, wherein the continuation decision unit determines whether the object is a moving body by comparing a predetermined sub-pixel threshold with a difference between a centroid position of a presently received-light waveform and a centroid position of a previously received-light waveform.

3. An automatic water faucet comprising:
    a water faucet that discharges water to the inside of a bowl provided with a drainage port at the bottom of the bowl;
    a person-detecting sensor according to claim 1; and
    a water supply control unit that performs the switching of discharging and stopping of water from the water faucet by using a sensor signal that is output by the person-detecting sensor depending on whether the current state is a detection state or a non-detection state.

4. The person-detecting sensor according to claim 1, wherein the second threshold is below fifty percent of the first threshold.

5. The person-detecting sensor according to claim 2, further comprising a control unit that stores two latest data of the centroid position, and rewrites the stored older data of the centroid position with new data when a new centroid position is identified.

* * * * *